(12) United States Patent
Stephens

(10) Patent No.: US 7,250,901 B2
(45) Date of Patent: Jul. 31, 2007

(54) SYNTHETIC APERTURE RADAR SYSTEM AND METHOD FOR LOCAL POSITIONING

(75) Inventor: Scott Adam Stephens, Phoenix, AZ (US)

(73) Assignee: NavCom Technology Inc., Torrance, CA (US)

( * ) Notice: Subject to any disclaimer, the term of this patent is extended or adjusted under 35 U.S.C. 154(b) by 0 days.

(21) Appl. No.: 10/614,097

(22) Filed: Jul. 3, 2003

(65) Prior Publication Data
US 2005/0088335 A1    Apr. 28, 2005

(51) Int. Cl.
G01S 13/08    (2006.01)
H01Q 15/00    (2006.01)

(52) U.S. Cl. .................... 342/146; 342/5; 342/126

(58) Field of Classification Search ............ 342/81, 342/126, 146, 450, 361–365, 457, 5–10; 333/21; 343/756
See application file for complete search history.

(56) References Cited

U.S. PATENT DOCUMENTS

| | | | |
|---|---|---|---|
| 4,710,020 A | 12/1987 | Maddox et al. | |
| 4,829,442 A | 5/1989 | Kadonoff et al. | |
| 4,873,449 A | 10/1989 | Paramythioti et al. | |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,874,918 A | 2/1999 | Czarnecki et al. | |
| 5,933,079 A | 8/1999 | Frink | |
| 5,982,164 A * | 11/1999 | Czarnecki et al. | ....... 324/76.33 |
| 5,986,602 A | 11/1999 | Frink | |
| 6,011,974 A | 1/2000 | Cedervall et al. | |
| 6,072,421 A | 6/2000 | Fukae et al. | |

(Continued)

OTHER PUBLICATIONS

H. Edelsbruneer and T.S. Tan, "Quadratic time algorithm for the minmax length triangulation", Proceedings of the 32$^{nd}$ Annual Symposium on Foundations of Computer Science, pp. 414-423, 1991, San Juan, Puerto Rico.

(Continued)

Primary Examiner—Thomas H. Tarcza
Assistant Examiner—Isam Alsomiri
(74) Attorney, Agent, or Firm—Morgan, Lewis & Bockius LLP

(57) ABSTRACT

A positioning system includes a passive, isotropic reflecting landmark at a fixed position and a device. The device transmits an electromagnetic pulse having a circular polarization and receives a return signal over a period of time. The return signal includes a reflected pulse from the reflecting landmark. The processes the return signal to isolate the reflected pulse from the return signal and to determine a range from the device to the reflecting landmark. The reflecting landmark includes a first passive reflector, a second passive reflector, and a static structure configured to statically position the second passive reflector at an angle relative to the first passive reflector. The device optionally moves in a particular direction while receiving the return signal, detects a Doppler shift in the reflected pulse portion of the return signal, and determines an angle between the particular direction and a straight line between the device and the landmark.

16 Claims, 12 Drawing Sheets

U.S. PATENT DOCUMENTS

| | | |
|---|---|---|
| 6,424,264 B1 | 7/2002 | Giraldin et al. |
| 6,427,079 B1 | 7/2002 | Schneider et al. |
| 6,459,966 B2 | 10/2002 | Nakano et al. |
| 6,489,917 B2 | 12/2002 | Geisheimer et al. |
| 6,556,942 B1 | 4/2003 | Smith |
| 6,608,593 B2 * | 8/2003 | Holt ........................... 342/453 |
| 2001/0027360 A1 | 10/2001 | Nakano et al. |
| 2001/0051527 A1 | 12/2001 | Kuwahara et al. |
| 2002/0097181 A1 | 7/2002 | Chou et al. |
| 2003/0005030 A1 | 1/2003 | Sutton et al. |
| 2003/0007473 A1 | 1/2003 | Strong et al. |
| 2004/0008153 A1 * | 1/2004 | Lemensdorf et al. ....... 343/895 |

OTHER PUBLICATIONS

M.N. Afsar, Yong Wang, and D. Hanyi, "A new wideband cavity-backed spiral antenna", Proceedings of the 2001 IEEE Antennas and Propagation Society International Symposium, vol. 4, pp. 124-127.

* cited by examiner

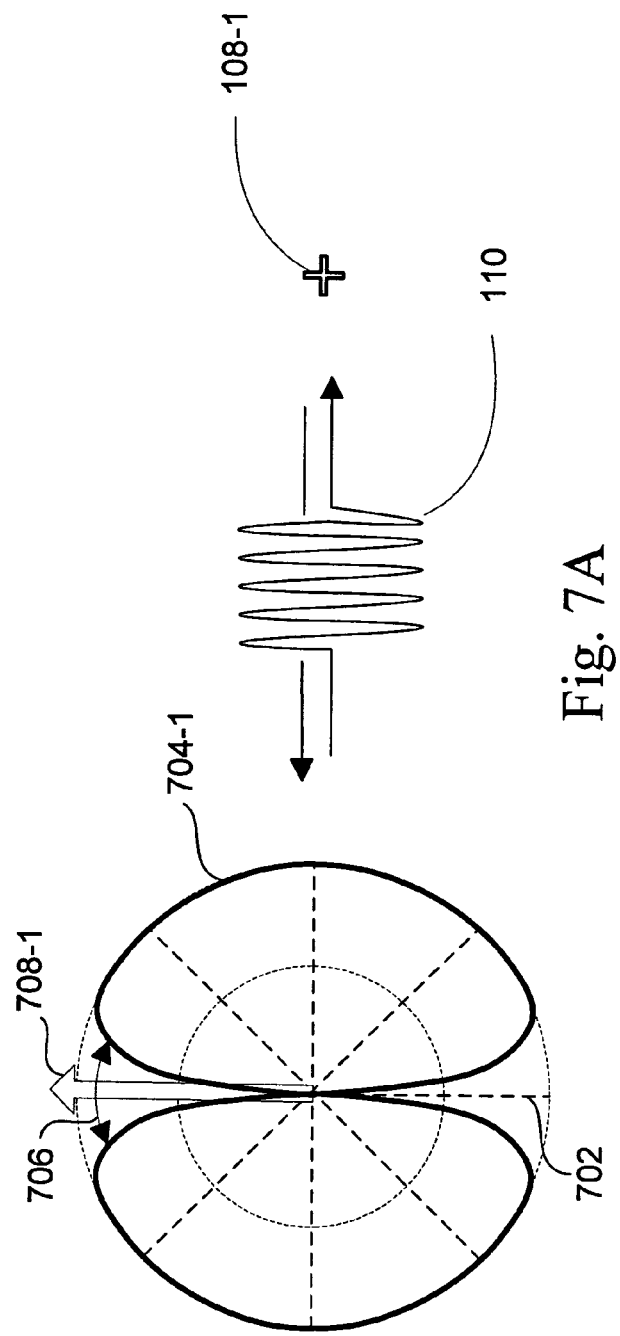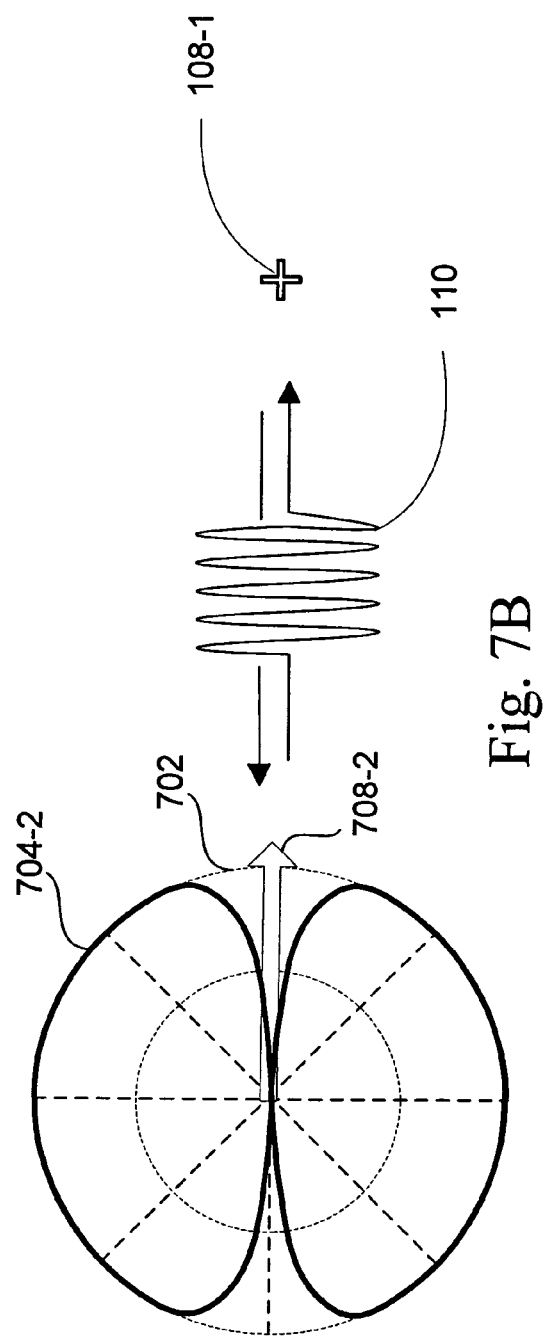

SYNTHETIC APERTURE RADAR SYSTEM AND METHOD FOR LOCAL POSITIONING

FIELD OF THE INVENTION

The present invention relates generally to positioning systems, and more specifically, to a system and method for determining the position of a mobile device relative to a number of passive landmarks via coherent radio-frequency ranging techniques.

BACKGROUND OF THE INVENTION

Local positioning systems are becoming an important enabler in mobile devices requiring navigation capabilities, especially in applications of autonomous vehicles and precision construction tools. Global positioning systems such as GPS provide only medium accuracy position information, usually no better than 10 cm, and require a clear view of the sky to near the horizon. Local positioning systems, with either active or passive components distributed in a working volume, can allow much more accurate (<1 cm) positioning, and allow the user to expand the system as necessary to operate in even the most complex enclosed geometries.

Conventional local positioning systems include acoustic and laser ranging systems. Acoustic systems typically use transponder beacons to measure range within a network of devices, some of which are fixed to form the local coordinate system. Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. However, laser systems currently employ expensive pointing mechanisms that can drive the system cost to $30K or more.

A relatively low-cost ($\leq$$2000) local positioning system able to determine 2D or 3D positions to accuracies of a few millimeters would enable a large set of potential products, in such application areas as precision indoor and outdoor construction, mining, precision farming, and stadium field mowing and treatment. The present invention overcomes the cost and accuracy limitations of conventional local positioning systems.

SUMMARY OF THE INVENTION

The system and method of the present invention provide a low-cost, yet highly accurate, local positioning system. Electromagnetic pulses are used to determine ranges and, optionally, angles between a device and a number of passive, isotropic landmarks. The propagation speed of the electromagnetic pulses does not vary as strongly with environmental conditions as does that of acoustic signals, providing superior accuracy in ranging. The spatial beamwidths of the antennas used to transmit electromagnetic pulses are substantially wider than those of lasers, eliminating the need for costly pointing mechanisms. The landmarks used are passive, and therefore do not require the expense of active components nor the expense of maintenance (e.g., battery replacement).

In one embodiment, the positioning system includes a number of landmarks at fixed positions and a device whose position is to be determined. The device is configured to transmit an electromagnetic pulse having a first circular polarization. The device is further configured to receive a return signal over a period of time and to process the return signal so as to isolate a reflected pulse contained in the return signal. The device is further configured to, based on a time of flight of the reflected pulse, determine a range from the device to the reflector. Each landmark includes a first passive reflector for reflecting electromagnetic pulses, a second passive reflector, and a static structure configured to statically position the second passive reflector at an angle of about 90° relative to the first passive reflector.

The method for local positioning, according to one embodiment, includes transmitting a pulse having a first circular polarization from a device, receiving a return signal including a reflected pulse from a landmark, and processing the return signal so as to isolate the reflected pulse from the return signal and to determine a range from the device to the landmark. The receiving includes preferentially receiving signals having the first circular polarization.

In some embodiments, the method further includes moving the device in a particular direction, at a velocity, while performing the receiving step, detecting a Doppler shift in the reflected pulse portion of the return signal, and determining an angle between the particular direction and a straight line between the device and the landmark.

BRIEF DESCRIPTION OF THE DRAWINGS

Additional objects and features of the invention will be more readily apparent from the following detailed description and appended claims when taken in conjunction with the drawings.

FIG. 7A is an illustration of a transmission antenna radiation pattern having a null over a first respective range of angles, a landmark, a transmitted pulse, and a reflected pulse.

FIG. 7B is an illustration of a transmission antenna radiation pattern having a null over a second respective range of angles, a landmark, a transmitted pulse, and a reflected pulse.

Like reference numerals refer to corresponding parts throughout the several views of the drawings.

DETAILED DESCRIPTION OF THE DRAWINGS

Figure 1A:
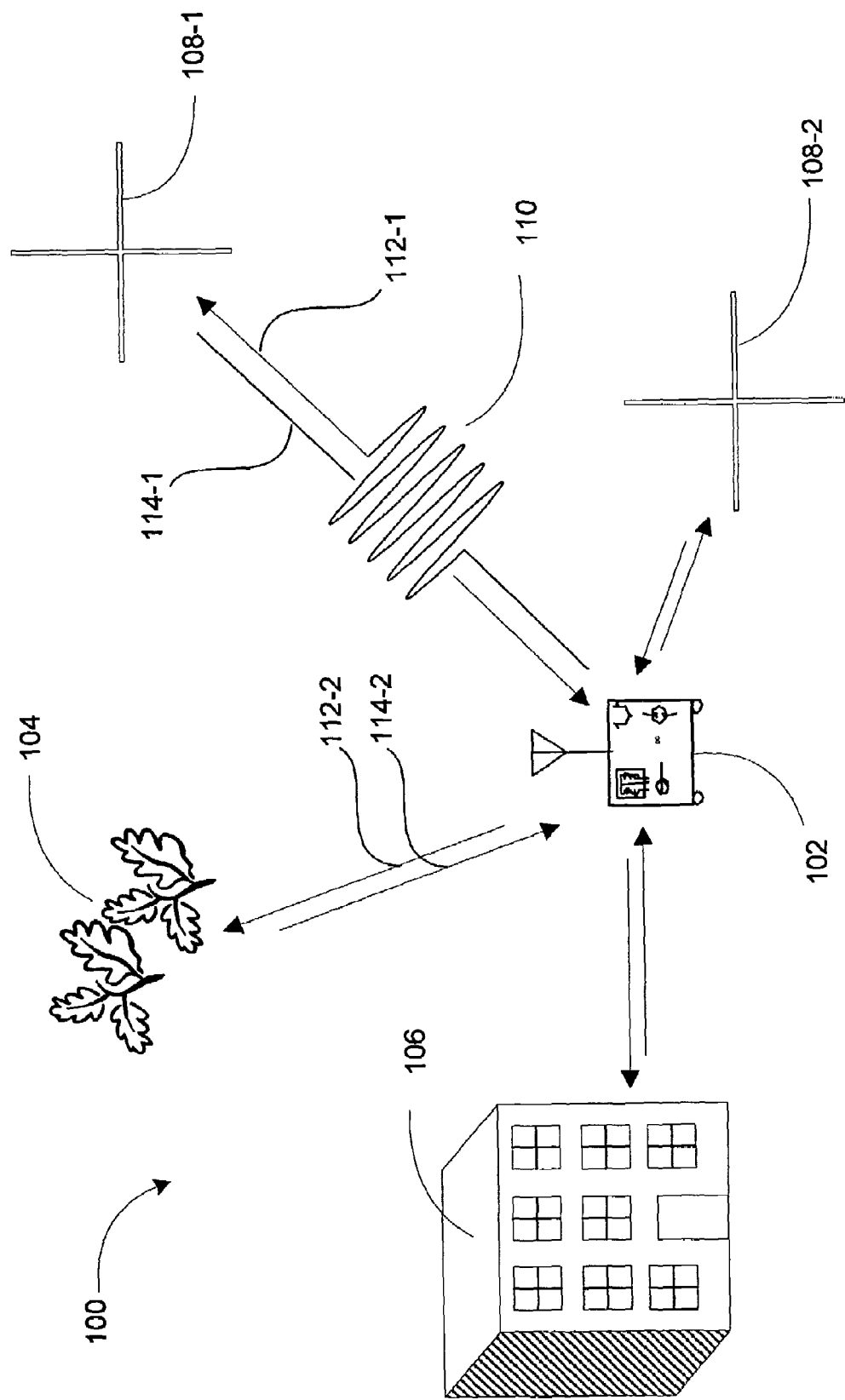
FIG. 1A is a diagram illustrating the position system, including a device, a number of landmarks and a variety of clutter objects. The device transmits a pulse and receives a return signal including a reflected pulse from a landmark.

Referring to FIG. 1, a local positioning system 100 includes a device 102 and a number of landmarks 108 whose position is fixed. The landmarks 108 may be placed at surveyed locations. Alternately, the landmarks may be placed at arbitrary positions that are automatically determined during an initial system self-calibration procedure. In either case, the position of device 102 is determined relative to the position of the landmarks by determining a set of ranges, each range relating to a distance between the device and a landmark. Device 102 is configured to transmit an electromagnetic pulse 110. In a preferred embodiment electromagnetic pulse is 1 nanosecond (ns) in duration, and has a carrier frequency of 6 gigahertz (GHz). Other embodiments may employ pulse duration and carrier frequency pairings of: 1 ns and 24 GHz, 5 ns and 6 GHz, and 1 ns and 77 GHz. The increased accuracy of range estimation available from shorter pulse durations and higher carrier frequencies comes at the expense of increased cost and complexity of associated circuitry in some embodiments. Electromagnetic pulse 110 is transmitted in a number of directions 112. Device 102 is further configured to receive a return signal, the return signal including a reflected pulse from each landmark 108. The return signal consists of contributions from a number of reception directions 114. Some reception directions include reflected pulses from "clutter," objects other than the landmarks that reflect electromagnetic pulses. For example, foliage 104, when illuminated by an electromagnetic pulse transmitted along direction 112-2, will reflect an electromagnetic pulse along direction 114-2. Similarly, building 106, when illuminated by an electromagnetic pulse transmitted along direction 112-3, will reflect an electromagnetic pulse along direction 114-3.

To determine the respective ranges between the device and each landmark, the device 102 isolates reflected pulses from landmarks from the return signal, which also includes reflected pulses from the clutter. To facilitate isolation of reflected pulses from the landmarks, device 102 transmits an electromagnetic pulse having a first circular polarization. The polarization may either be right-hand circular polarization (RHCP) or left-handed circular polarization (LHCP) as would be appreciated by one of skill in the art of electromagnetic signal transmission. Clutter, for example foliage 104, will reflect an electromagnetic pulse having a primarily opposite circular polarization along reception directions 114. For example, if device 102 transmits an RHCP electromagnetic pulse along direction 112-3, building 106 will reflect a primarily LHCP electromagnetic pulse along direction 114-3. Landmarks 108, on the other hand, are configured to passively reflect pulses having the same circular polarization as that of the incident pulse. Thus, a device isolates the pulses reflected from the landmarks, in part, by preferentially receiving pulses having the same polarization as the electromagnetic pulses transmitted. Active, powered landmarks could be used to produce reflected pulses having the same polarization as the pulse transmitted by the device. A disadvantage of this approach is that in some applications, power may only be available to the landmarks through batteries, adding to the maintenance necessary to the positioning system.

To overcome these difficulties, some embodiments of the present invention include passive landmarks 108 that, when illuminated with an electromagnetic pulse having a circular polarization, reflect a pulse having the same circular polarization. Referring to FIG. 1B, device 102 transmits an electromagnetic pulse having a first circular polarization along direction 112-1. Landmark 108-1 generates a first reflected pulse having an opposite circular polarization that travels along path 116. Landmark 108-1 subsequently generates a second reflected pulse having the original circular polarization along receiving direction 114-1, ultimately being received at device 102. In contrast, a pulse transmitted by device 102 along direction 112-2 having a circular polarization is reflected by foliage 104. The reflected pulse has a primarily opposite circular polarization and travels along reception direction 114-2, ultimately being received at device 102. Thus, by preferentially receiving pulses having the same polarization as the electromagnetic pulses transmitted, a device may isolate the pulses reflected from the landmarks. Further details regarding devices that preferentially receive pulses having the same polarization as pulses they transmit is provided below in conjunction with the discussion of FIG. 5. Further details regarding embodiments of landmarks that reflect pulses having the same polarization as the incident pulse is provided below, in conjunction with the discussion of FIG. 4.

Once the pulse reflected from a landmark is isolated from the return signal received by the device, a range between the device and the landmark is determined. Assuming that pulses travel in straight lines and that there is no multipath propagation, a pulse transmitted by device 102 and reflected by an object some distance r away from the device will arrive at device 102 with time of arrival (ToA)

$$ToA = 2\frac{r}{c} \qquad \text{(Equation 1)}$$

where c is the propagation speed of electromagnetic signals. The propagation speed of electromagnetic signals, c, is known to be approximately $3.0*10^8$ m/s in a vacuum. In typical atmospheric conditions, the propagation speed of electromagnetic signals deviates from this value by less than 300 ppm (parts per million). By employing information about the altitude and other environmental factors the propagation speed of electromagnetic signals in the environment of the positioning system can be determined to within 100 ppm. Thus, determination of the time of arrival of the pulse can be used to accurately estimate the range between the device and the landmark.

Figure 1B:
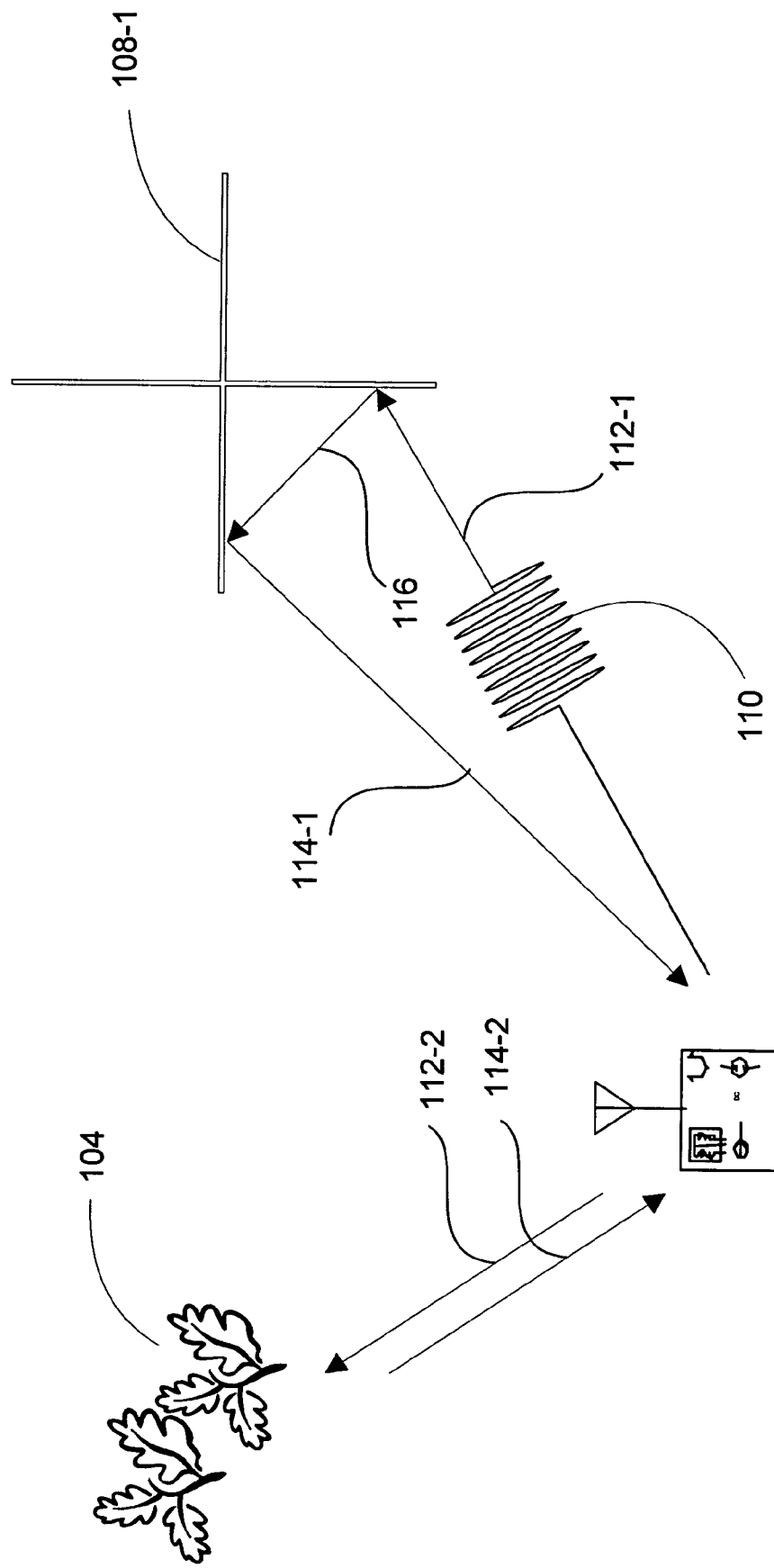
FIG. 1B illustrates the reflection of an electromagnetic pulse by a landmark in the positioning system. The pulse undergoes two reflections before being received by the device. As a result, a pulse transmitted from the device having a first circular polarization will have the same first circular polarization when received by the device.

Although in FIG. 1A there are only two landmarks, in other embodiments more, or fewer, devices may be present. In some embodiments, the number of landmarks used will be adequate to provide unambiguous determination of the position of the device relative to landmarks whose position have been surveyed. For example, if the positions of three landmarks are known (e.g., by surveying them in advance), these three landmarks are not collinear, and the device and the landmarks are located substantially within a two-dimensional plane, it is possible to determine the position of the device unambiguously from knowledge of the ranges from the device to each of the landmarks. For the special case where the position of the mobile device is known a priori to be restricted to a single half-plane defined by two landmarks, the ranges to these two landmarks is sufficient to unambiguously determine the position of the mobile device. Algorithms for the determination of position based on one or more ranges are well-known to one of skill in the art. See, for example "Quadratic time algorithm for the minmax length triangulation," H. Edelsbruneer and T. S. Tan, pp. 414–423 in *Proceedings of the 32nd Annual Symposium on Foundations of Computer Science*, 1991, San Juan, Puerto Rico, hereby incorporated by reference in its entirety. In other embodiments, the device and landmarks may not all be positioned in the same two-dimensional plane. In these embodiments, the position of at least four non-coplanar landmarks must be known to enable unambiguous determination of the position of the device from knowledge of the ranges between the device and each of the landmarks. As before, a priori restrictions on the possible location of the mobile device allow, in some embodiments, unambiguous positioning with only three landmarks.

Figure 2A:
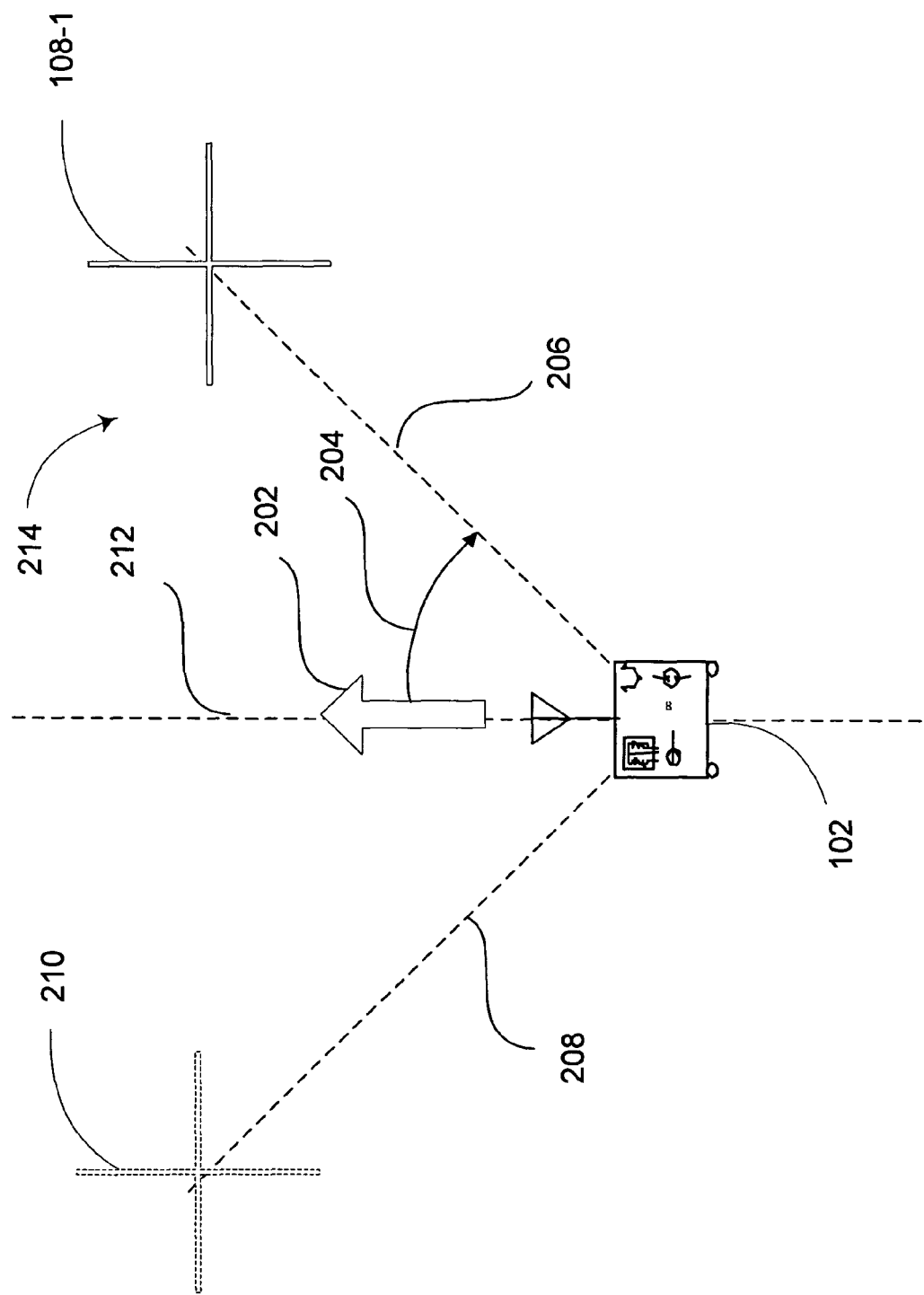
FIG. 2A illustrates the device moving with a particular velocity, so that the reflected pulse portion of the return signal will contain a Doppler shift.

In addition to determining a range from the device to a landmark, in some embodiments the device moves with a velocity v in a particular direction, transmits a pulse, receives a return signal over a period of time, and determines an angle between the direction of device movement and the line between the device and a landmark. Referring to FIG. 2A, device 102 moves with a velocity v in direction 202 both while transmitting a pulse and receiving a return signal. Direction 202 and the line 206 between the device 102 and the landmark 108 form an angle 204. The pulse reflected from the landmark and received by the device will be Doppler shifted in frequency, in accordance with $$f = f_c\left(1 + \frac{v}{c}\cos(\theta)\right) \quad \text{(Equation 2)}$$

where $f_c$ is the carrier frequency, f is the frequency of the pulse, as received by the device, c is the propagation speed of electromagnetic signals in the atmosphere that fills the space between the device 102 and the landmark 108-1, and θ is the angle 204. Thus, from the frequency of the received pulse, the device can determine an angle θ. For a given received pulse frequency f however, there are at least two angles that satisfy Equation 2. This is so because, for any angle $\theta_0$ that solves Equation 2, the angle $-\theta_0$ also solves Equation 2. In FIG. 2A, these two angles correspond to the angle 204 between direction 202 and line 206 between the device and the landmark, and the angle between direction 202 and line 208. Thus, from a single measurement of the Doppler shift of a return signal, it is not possible to distinguish a reflected pulse reflected by landmark 108-1 from a reflected pulse reflected by phantom landmark location 210. To remove this ambiguity in determining the angle between the device and a landmark, device 102, in some embodiments, transmits pulses having power substantially different than zero only in hemisphere 214, the portion of the environment to the right of line 212 in FIG. 2A. More generally, hemisphere 214 may be defined by any plane perpendicular to a plane in which all the landmarks and the device lie and containing direction 202. In other embodiments, device 102 alternately transmits pulses to a first hemisphere and to a second, non-overlapping hemisphere, enabling unambiguous determination of the angle between the device and a landmark. In still other embodiments, device 102 may transmit an electromagnetic pulse in all directions, but alternately preferentially receive reflected pulses having receiving directions in a first hemisphere and reflected pulses received from directions in a second, non-overlapping hemisphere, enabling unambiguous determination of the angle between the device and a landmark.

Figure 2B:
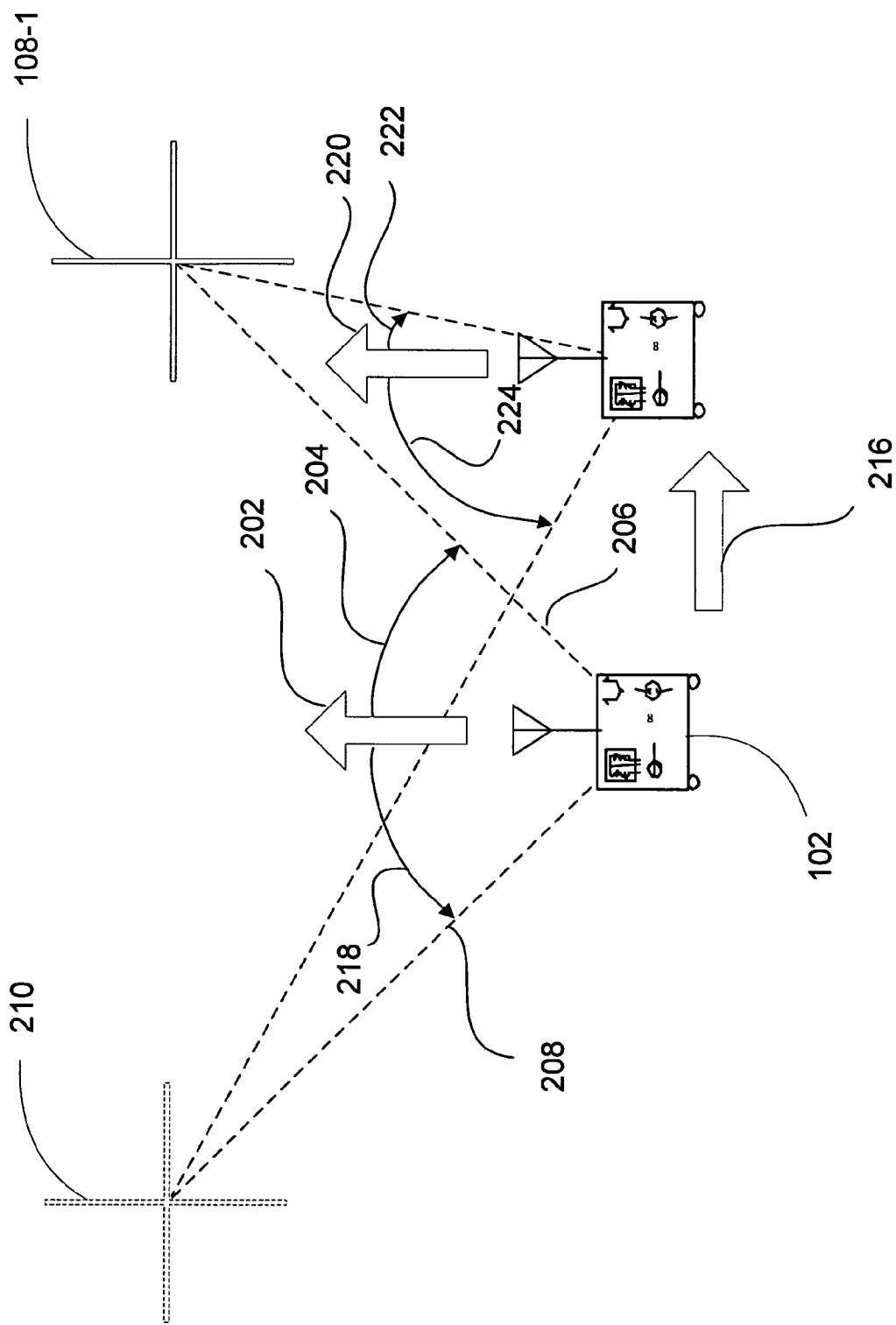
FIG. 2B illustrates the device moving in a first direction, with a particular velocity, and receiving a first return signal. The device then moves a distance in a second direction. Later, the device is again moving in the first direction, with the particular velocity, and receives a second return signal.

In still other embodiments, as illustrated in FIG. 2B, device 102 transmits a first pulse and receives a first return signal while moving in direction 202, moves some distance in an orthogonal direction 216, and transmits a second pulse and receives a second return signal while moving in direction 220. As FIG. 2B illustrates, although the magnitude of angle 204 between direction 202 and the line between the device and the landmark is the same as that of angle 218 between direction 202 and the line 208 between device 202 and phantom landmark location 210, the angle 222 related to the landmark 108-1 and the device at its second position is different form the angle 224 related to the phantom landmark position 210 and the device at its second location. Thus, it is possible for the device to uniquely determine the angle between direction 202 and the line between the device and the landmark by analyzing the first and second return signals together.

Figure 3:
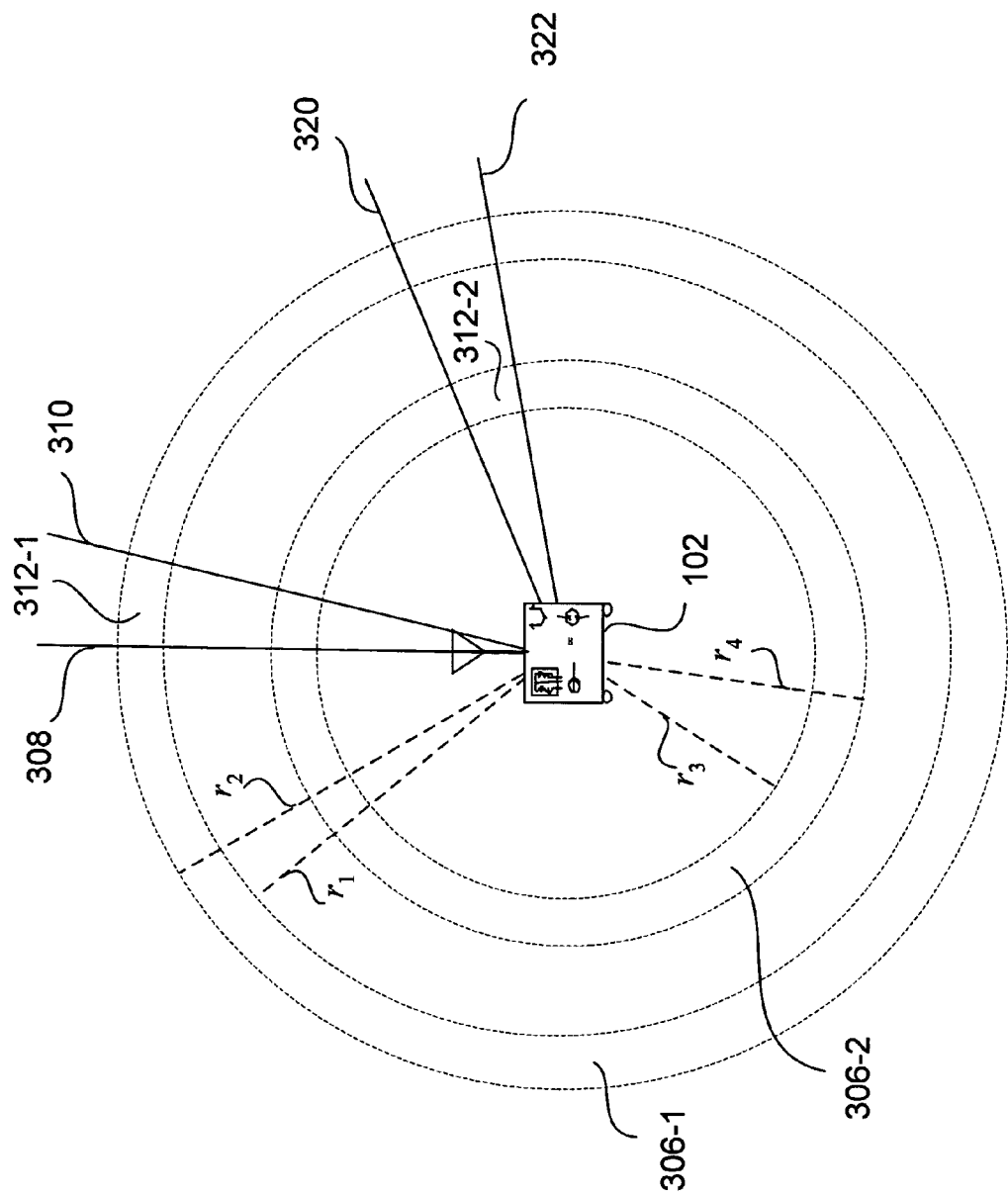
FIG. 3 illustrates the range and range-angle bins used to isolate reflected pulses from the return signal.

One aspect of the present invention is the ability to isolate a reflected pulse reflected from a return signal received over a period of time. Referring to FIG. 3, device 102 transmits an electromagnetic pulse and receives a return signal over a period of time. To isolate the reflected pulse from the return signal, device 102 separates the return signal into a number of range bins based on the time of arrival of the return signal. Referring again to FIG. 3, portions of the return signal arriving at the device later than time $t_1 = 2^{r_1}/c$ and earlier than time $t_2 = 2^{r_2}/c$ are determined to have been reflected by objects in range bin 306-1. Range bin 306-1 includes all objects located at distances greater than $r_1$ and less than $r_2$ from device 102. Thus, by extracting the portion of the return signal arriving between times $t_1$ and $t_2$, device 102 can isolate a reflected pulse from a reflecting object residing in range bin 306-1. This process can be repeated, with different ranges of times of arrival, to isolate reflected pulses from objects residing in other range bins. For example, portions of the return signal arriving at the device later than time $t_3 = 2^{r_3}/c$ and earlier than time $t_4 = 2^{r_4}/c$ are determined to have been reflected by objects in range bin 306-2. Range bin 306-2 includes all objects located at distances greater than $r_3$ and less than $r_4$ from device 102. Thus, by extracting the portion of the return signal arriving between times $t_3$ and $t_4$, device 102 can isolate a reflected pulse if only one reflecting object resides in range bin 306-2.

In some instances, more than one reflecting object may reside in a particular range bin 306. This can be particularly troublesome, for instance, when more than one landmark resides in a particular range bin. In some embodiments of the present invention, this problem is overcome by determining both a time of arrival and a Doppler shift of the return signal received by the device. In the discussion of FIGS. 2A–B, above, methods of determining an angle between a direction in which the device is moving and a line between the device and a reflecting object were discussed. Note that angle determination from range change with time is equivalent to a Doppler shift measurement, when range is expressed in terms of carrier wavelengths. Referring to FIG. 3, device 102 in some embodiments moves in a direction along line 308 while transmitting a pulse and receiving the respective return signal. In this case, there will be some band of Doppler shifts associated with angles of arrival between 0° and the angle formed by line 308 and line 310. By filtering out portions of the return signal having Doppler shifts outside this band, device 102 can further isolate reflected pulses coming only from objects residing in range-angle bin 312-1 from the return signal associated with range bin 306-1. Similarly, there will be a second band of frequencies associated with angles of arrival between the angle formed by line 308 and line 320 and the angle between line 308 and line 322. By filtering out portions of the return signal having frequencies having Doppler shifts outside this band, device 102 can further isolate reflected pulses coming only from objects residing in range-angle bin 312-2 from the return signal associated with range bin 306-2.

Applying this technique to a number of range-angle bins, return signal power as a function of range and angle can be determined. In some embodiments, the radar cross-section of the landmarks is known, either by measurement or by theoretical prediction. Together with knowledge of how much power is transmitted in a pulse, a device can then calculate the expected return signal power from a pulse reflected by a landmark. Subsequently, each range-angle bin can be inspected and determined to either contain a landmark or not. The expected radar return power from objects other than landmarks will be much less that the landmarks themselves, as the reflected pulses from these objects will generally have a different circular polarization than the circular polarization of the transmitted pulse, and are filtered out by the device in the preferential receiving of signals having the same circular polarization as the transmitted pulse.

Landmarks for use in a positioning system in accordance with the present invention generate reflected pulses having the same circular polarization as a pulse incident upon them. Additionally, it is desirable that the landmark have a substantially isotropic radar cross-section, at least in a plane containing the landmarks and the device. In some embodiments, the device determines whether a given range-angle bin contains a landmark by comparing the return signal power from the range-angle bin to the expected reflected pulse power from a landmark. The reflected pulse power depends on the radar cross-section of the landmark. Thus, if the device does not know the orientation of the landmark relative to the line between the device and the landmark, it will only be possible to compute the expected radar cross-section of the landmark if the radar cross-section is the same for all possible orientations of the landmark. Thus, in some embodiments, the landmark has a substantially isotropic radar cross-section, the cross-section varying by less than 6 dB over all azimuth angles in a plane containing the landmarks and the device.

Figure 4:
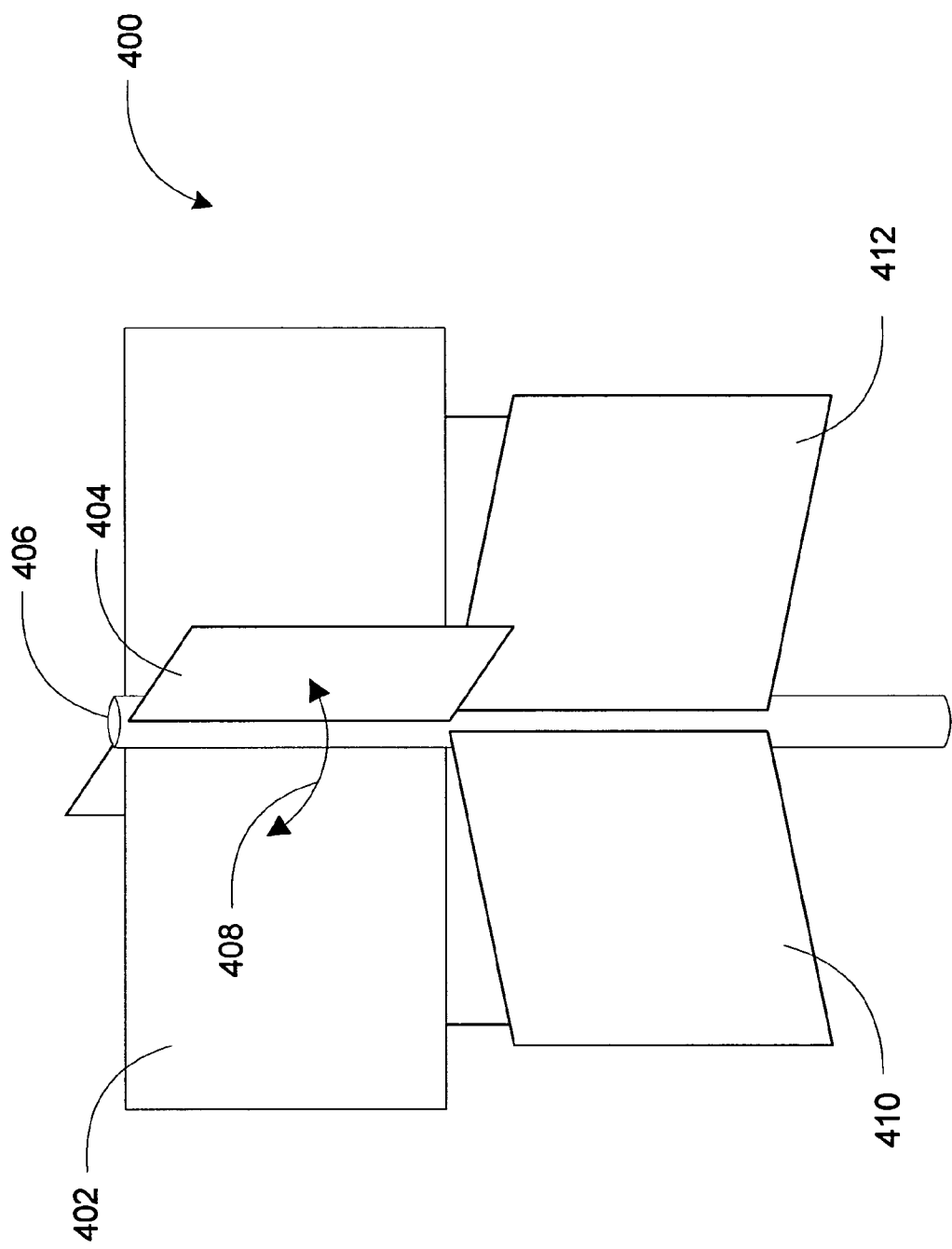
FIG. 4 illustrates a landmark for use in the positioning system, including a first passive reflecting surface, a second passive reflecting surface, and a structure for positioning the second surface at an angle relative to the first surface.

Referring to FIG. 4, a landmark 400 in accordance with the present invention includes:

a first passive reflector 402 for reflecting electromagnetic pulses;

a second passive reflector 404 for reflecting electromagnetic pulses; and a static structure 406 configured to statically position the second passive reflector at an angle 408 relative to the first passive reflector.

Examples of materials that may be employed to manufacture passive reflectors 402 and 404 that reflect electromagnetic pulses include, but are not limited to, conductors such as aluminum, copper, and other metals. The shape of passive reflectors in some embodiments is different than that of those depicted in FIG. 4, for instance having rounded corners that would be less likely to lacerate a person, or designed to fit more easily into a protective container, such as a plastic sphere.

An electromagnetic pulse having a first circular polarization (RHCP or LHCP) incident upon the first passive reflector 402 will be reflected with a second circular polarization (LHCP or RHCP, respectively). Then, the pulse reflected by the first passive reflector 402 will be reflected by the second passive reflector 404 with the first circular polarization (RHCP or LHCP, respectively). So that the pulse reflected by the second passive reflector 404 travels in the direction opposite to that of the original incident pulse, ultimately arriving at the device that transmitted the original pulse, angle 408 is about 90°. Due to manufacturing tolerances and mechanical disturbances once deployed as a landmark, it may not be possible for angle 408 to be precisely 90°. Also, since the reflectors are of finite length and may only be a few carrier wavelengths long, the reradiation pattern, in preferred embodiments, will be strong over several degrees. In some embodiments, the device will transmit pulses in more than one direction and will be sensitive to return signals from more than one direction, so angle 408 may include 90°±3°. In other embodiments, useful angles 408 may include 90°±10°.

A circularly polarized electromagnetic pulse that is incident on the edge of first passive reflector 402 or second passive reflector 404 will be reflected only once, by the second or first passive reflector respectively, and will therefore be reflected with a different circular polarization than that with which it was incident. In this case, the device would not be able to isolate pulses reflected by a landmark from pulses reflected by other objects in the environment. To remedy this problem, in some embodiments landmark 400 further includes third passive reflector 410 and fourth passive reflector 412. Static structure 406 is further configured to statically position reflector 410 at an angle of about 90° relative to reflector 412. Static structure 406 is further configured to statically position reflector 410 at an angle different than zero relative to reflector 402. The angle between reflectors 410 and 402 may be about 45°, and is preferably between 30° and 60°, although an angle between 1° and 89° may be used. Reflectors 402 and 404 form a first dihedral pair. Similarly, reflectors 410 and 412 form a second dihedral pair. By positioning reflector 410 at an angle different than zero relative to reflector 402, when a circularly polarized electromagnetic pulse that is incident on the edge of one of the reflectors in the first dihedral pair, the pulse will not be incident on the edges of either of the reflectors in the second dihedral pair. Similarly, a pulse incident on the edge of one of the reflectors in the second dihedral pair will not be incident on the edges of either of the reflectors in the first dihedral pair. Thus, any circularly polarized pulse incident on landmark 400 will generate at least one reflected pulse having the same circular polarization. In other embodiments, landmark 400 may include trihedral reflectors, other wise known as "corner cube" reflectors. In still other embodiments, landmark 400 may include a Lunenburg lens.

Figure 5:
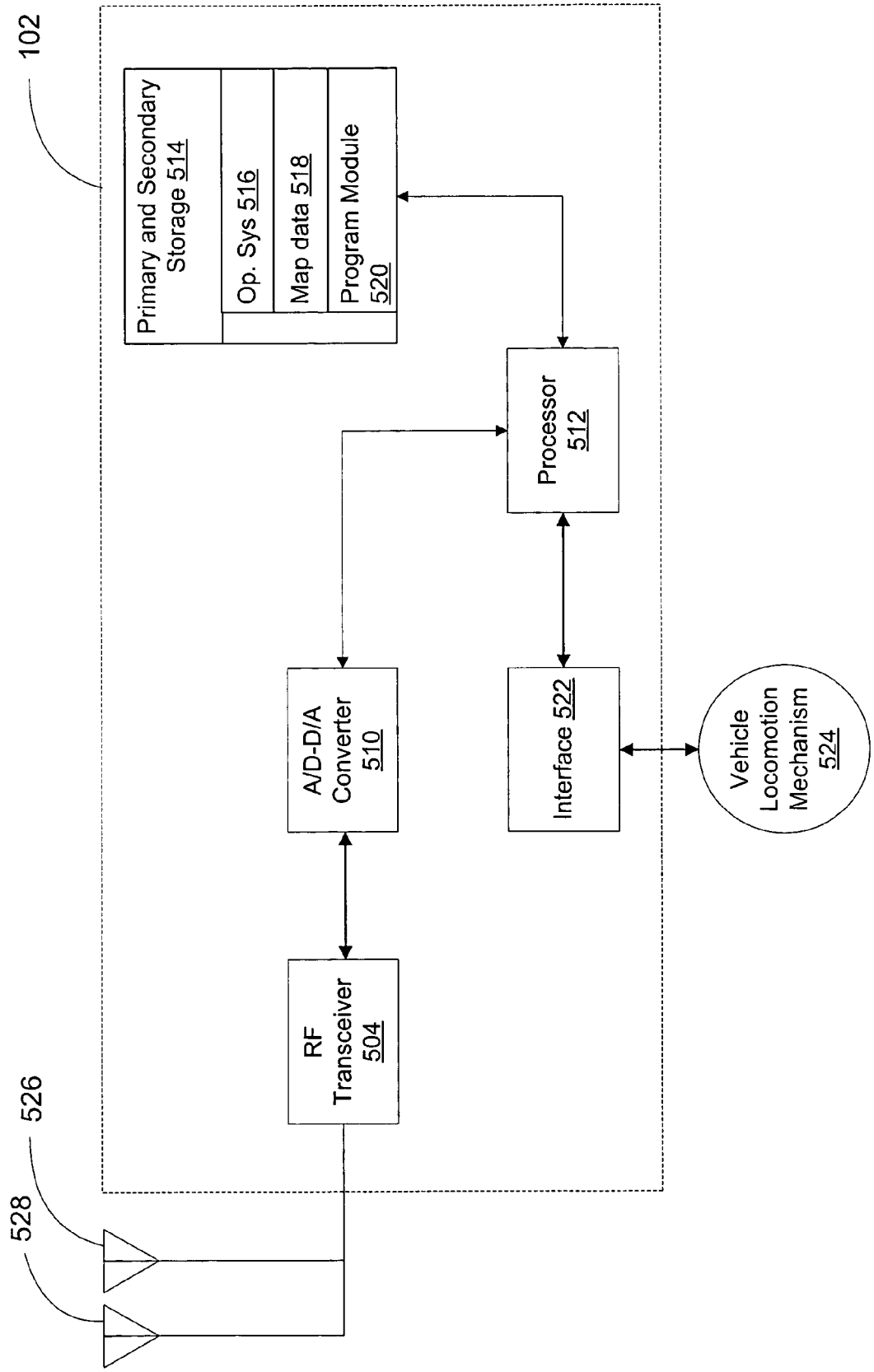
FIG. 5 is a block diagram, illustrating the components of a typical device for use in the positioning system.

Referring to FIG. 5, a device 102 in accordance with the present invention includes:
- a vehicle locomotion mechanism 524 for moving the device in a particular direction, at a velocity;
- an electromechanical interface circuit 522;
- an antenna 526 for transmitting electromagnetic pulses and receiving a return signal;
- an RF transceiver 504;
- a digital-to-analog (D/A) and analog-to-digital (A/D) converter 510;
- a processor 512; and
- secondary and primary storage 514, the storage further including:
  - an operating system 516;
  - map data 518; and
  - and at least one program module 520, executed by processor 512.

In some embodiments, program module 520 includes instructions for transmitting a pulse at a first position of the device and at a known time relative to the pulse receiver and sampler, while the device is stationary. In accordance with these instructions, processor 512 sends a signal to D/A converter 510, generating a pulse which is modulated by RF transceiver 504 to a carrier frequency. The modulated pulse is then transmitted by antenna 526. Antenna 526 is configured to transmit an electromagnetic pulse having a particular circular polarization. In some embodiments, antenna 526 radiates isotropically in a plane containing the landmarks and the device. An example of an antenna that radiates substantially isotropically in a plane and transmits electromagnetic pulses having a particular circular polarization is antenna formed from two cavity-backed spiral antennas, placed back-to-back. See, for example "A new wideband cavity-backed spiral antenna," Afsar et al., which is hereby incorporated by reference in its entirety. In some embodiments, antenna 526 is a directional horn antenna with a mechanical azimuthal actuator. In other embodiments, antenna 526 includes a switched beam configuration using, for instance, a Rothman lens. In still other embodiments, antenna 526 includes electronically steerable phased-arrays.

In addition to instructions for transmitting an electromagnetic pulse, program module 520 includes instructions for receiving a return signal over a period of time. Antenna 526 receives a return signal, which may include one or more reflected pulses. The signal is passed to RF transceiver 504, where it is downconverted to the baseband relative to the carrier frequency. In some embodiments, RF transceiver 504 employs quadrature phase-preserving downconversion to baseband. The in-phase component of the downconversion, the quadrature component, or both are then passed to A/D converter 510, where they are sampled and processed by processor 512. In some embodiments, processor 512 is a microprocessor or other central processing unit. In other embodiments, it is an application specific integrated circuit (ASIC). Processor 512 processes the return signal so as to isolate the reflected pulse from the return signal and to determine a range from the device to the landmark. In some embodiments, this is done by storing the return signal over a period of time in primary and secondary storage, separating portions of the received signal into a number of range bins, and examining each bin for the presence of a landmark (as discussed in conjunction with the discussion of FIG. 3, above). Bins that are determined to contain a landmark are then assigned to a first set of range candidates. In other embodiments, this is done by storing the return signal over a period of time in primary and secondary storage, detecting Doppler shifts in the reflected the return signal, separating portions of the received signal into a number of range-angle bins, and examining each bin for the presence of a landmark. Bins that are determined to contain a landmark are then assigned to a set of range-angle candidates.

In some embodiments, program module 520 includes instructions for moving device 102 to a second position. The second position may be at a predefined separation distance from the first position. Central processing unit 512 executes this instruction by signaling interface 522, which in turn activates vehicle locomotion mechanism 524. In some embodiments, mechanism 524 includes an electric motor, the speed of which is controlled by the level of a DC voltage provided by interface 522. In other embodiments, mechanism 524 broadcasts a position determined by module 520 to another vehicle computer (not depicted). The other vehicle computer then makes decisions, based in part on the position determination, about vehicle movement. For example, in some embodiments, the other vehicle computer combines information from several positioning systems, including a global positioning system (GPS). Program module 520 further includes instructions for transmitting the pulse at the second position of the device and determining from the received return signal a second set of range candidates. Finally, program module 520 includes instructions for processing the first and second sets of range candidates to produce a reduced set of range candidates that are consistent with one or more potential landmark positions. In one embodiment, the program module 520 includes instructions for performing these steps at additional positions. The additional positions (i.e., locations) may be each separated from a respect prior position by a predefined separation distance.

To relate a Doppler shift in the return signal to an angular direction, the velocity of the device, or at least the magnitude of the velocity of the device, must be known. In some embodiments, vehicle locomotion mechanism 524 includes an optoelectronic sensor that feeds frequency information thorough interface 522 to processor 512. Together with information about vehicle locomotion mechanism 524, processor 512 converts this information into an estimation of the velocity of device 102. In other embodiments, the return signal from the clutter provides a method to measure platform velocity. With sufficient clutter, the return signal power spectrum will have a bandwidth equal to twice the maximum Doppler shift. The maximum Doppler shift is numerically equal to the platform velocity divided by the carrier wavelength. This type of measurement of vehicle velocity will, under some circumstances, be more accurate than those available from the device propulsion system. In still other embodiments, information on both differential and absolute bearing is also available from the Doppler shifts in the return signal. When a small change is made in the direction of the velocity of the device, both the reflected pulses from clutter and from landmarks will shift in angle of arrival. Thus, cross-correlations in angle over time can be used to estimate integrated direction changes.

To detect a Doppler shift in the return signal, in some embodiments processor 512 employs a fast Fourier transform (FFT). This technique is most accurate when the device moves with a constant velocity, in a constant direction, while receiving the return signal. If accelerations are experienced by the device while receiving the return signal, a pre-corrected FFT may be used for more accurate determination of Doppler shifts in the return signal. The coefficients of such a pre-corrected FFT are, in some embodiments, determined from inertial sensors of device velocity and direction.

Figure 6:
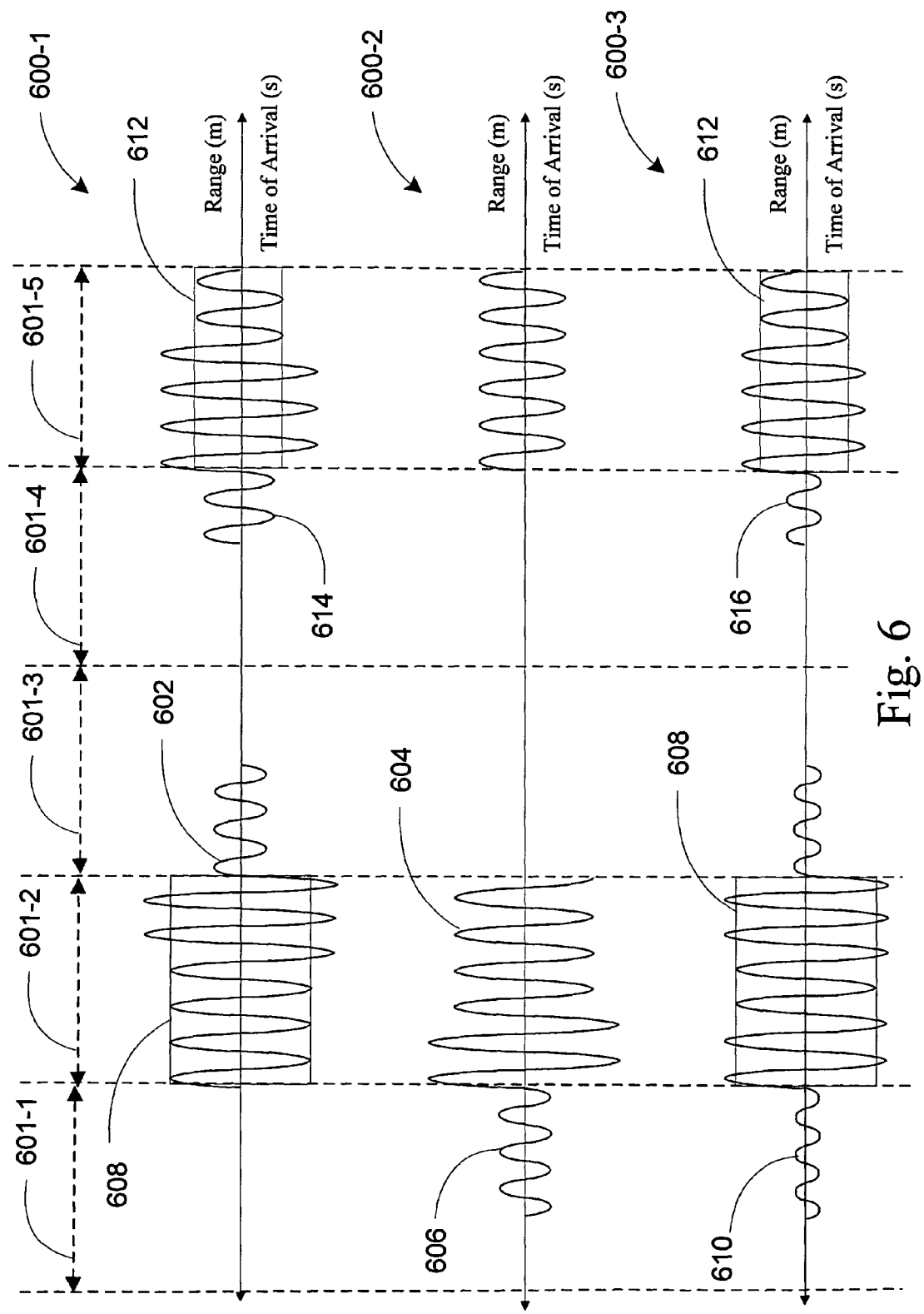
FIG. 6 illustrates a first return signal received after transmitting a first pulse, a second return signal received after transmitting a second pulse, and a processed return signal enabling selection of a reduced set of range candidates.

FIG. 6 illustrates a number of range bins 601, a first received return signal 600-1, a second received return signal 600-2, and a processed return signal 600-3. The device (102 in FIG. 1A) of the positioning system transmits a first electromagnetic pulse and receives first return signal 600-1 over a period of time. First return signal 600-1 contains a number of reflected pulses, some pulses having been reflected by landmarks and other pulses having been reflected by clutter objects, and additional noise from other sources. Thus, it is difficult for the device to isolate a pulse reflected by a landmark (indicated in FIG. 6 by the envelope 608 of a pulse reflected by a first landmark and envelope 612 of a pulse reflected by a second landmark). For example, in some embodiments return signal 600-1 contains signal tail 602 as the result of a pulse reflected by a clutter object. In other embodiments, signal tail 602 may be the result of imperfections in transmitter pulse generation or receiver filtering. In either case, signal tail 602 may cause range bin 601-2 and range bin 601-3 to be selected and added to a first set of range candidates by the device. Similarly, signal tail 614 may cause range bin 601-4 to be included in a first set of range candidates by the device. However, as the envelopes 608 and 612 of two pulses reflected by landmarks indicate, range bin 601-2 and range bin 601-5 are the only range bins in FIG. 6 that contain pulses reflected by landmarks. Thus, it is desirable to have a technique for reducing the set of range candidates so that it contains only those range bins corresponding to pulses reflected by landmarks.

In some embodiments, the device transmits a second electromagnetic pulse and receives a second return signal 600-2. Second return signal 600-2, in addition to containing signal 604 in range bin 601-2, includes signal tail 606 in range bin 601-1. Thus, processing of second return signal 600-2 by the device may lead to inclusion of range bins 601-1 and range bin 601-2 in a second set of range candidates. In some embodiments, the device processes first return signal 600-1 and second return signal 600-2 to arrive at a reduced set of range candidates. Referring again to FIG. 6, in some embodiments a third return signal 600-3 is generated, for example, by averaging first return signal 600-1 and second return signal 600-2. As a result the magnitude of signal tail 610 is substantially reduced relative to signal tail 606 in second return signal 600-2. Similarly, the magnitude of signal tail 616 is substantially reduced relative to that of signal tail 614 in first return signal 600-1. As a result, true envelope 608 of a pulse reflected from a first landmark and true envelope 612 of a pulse reflected from a second landmark of may be isolated and added to a reduced set of range candidates. For example, this may be accomplished by eliminating range candidates whose magnitude falls below a predefined threshold, or whose magnitude is less than the magnitude of other range candidates by at least a predefined multiplicative (or percentage) factor, or equivalently keeping only range candidates whose magnitude is above a predefined threshold or that meet another appropriate magnitude based selection criterion. In other embodiments, the device processes the first return signal, resulting in a first set of range candidates, processes the second return signal, resulting in a second set of range candidates, and selects a reduced set of range candidates by determining the range candidates present in both the first and second sets of range candidates.

In some embodiments, additional techniques are employed to isolate pulses reflected by landmarks from return signals containing pulses reflected by clutter objects. Referring to FIG. 7A, the antenna of the device (element 526 in FIG. 5) has an associated radiation pattern 704-1. One way of characterizing the radiation pattern of a transmission antenna or, correspondingly, the reception sensitivity of a receiving antenna, is through a plot of the relative signal magnitude (either transmitted or received, respectively) as a function of angle in the plane containing the landmarks and the device. Polar coordinate system 702 provides a convenient framework for this purpose. The polar coordinate system 702, as depicted in FIG. 7A, has at its center the antenna of the device. In some embodiments, the device uses an isotropic reception antenna. The transmission antenna, on the other hand, may have a radiation pattern 704-1 that has a null 706. Null 706 is characterized by a set of angles for which the radiation pattern is substantially less in magnitude than some threshold. For example, the null 706 may be defined by angles for which the radiation magnitude is less than $$\frac{1}{\sqrt{2}}$$

of its maximum value, corresponding to angles at which the antenna transmits signals having less than half the power of the signals transmitted with maximum power by the antenna. An alternate way to characterize a null 706 is via one particular direction, such as direction 708-1, selected to have an angle, measured relative to coordinate system 702, that is the average of the angles associated with null 706. In one embodiment, the null 706 has a width of less than 15°. In one embodiment the range of angles of the null is controlled by transmitting the pulses using at least two antennas driven by substantially identical signals having a phase difference. Referring to FIG. 5, the device 102 may include an optional second antenna 528 for this purpose. Referring back to FIG. 7A, the phase difference controls the range of angles of the null.

With the radiation pattern so oriented, an electromagnetic pulse 110 is transmitted by the device. Landmark 108-1 reflects the pulse, and the device receives a return signal including the reflected pulse. With the radiation pattern 704-1 oriented as in FIG. 7A, pulse 110 is generated by angles at which the transmission antenna transmits signals having large magnitudes (relative to signals transmitted in other directions). In some embodiments, the device, while at the same position, transmits a second electromagnetic pulse and receives a second return signal. Referring to FIG. 7B, the radiation pattern 704-2 of the transmission antenna is now in a second orientation, characterized by direction 708-2 as measured relative to polar coordinate system 702. A second pulse 110 is transmitted by the device, reflected by the landmark 108-1 and received by the device. With the radiation pattern 704-1 oriented as in FIG. 7B, pulse 110 is generated by angles at which the transmission antenna transmits signals having small magnitudes relative to signals transmitted in other directions. Thus, if the same power is radiated by the transmission antenna in each of the configurations in FIG. 7A and FIG. 7B, the received signal in the configuration of FIG. 7A will have a larger magnitude than that in the configuration of FIG. 7B. The radiation pattern of the transmission antenna may be placed in a second orientation by a variety of methods. In some embodiments, the device includes a vehicle locomotion mechanism (element 524 in FIG. 5), and the device changes its orientation relative to polar coordinate system 702. In other embodiments, the device includes a transmission antenna mounted on a motorized platform. In still other embodiments, the transmission antenna includes a phased-array.

Figure 7C:
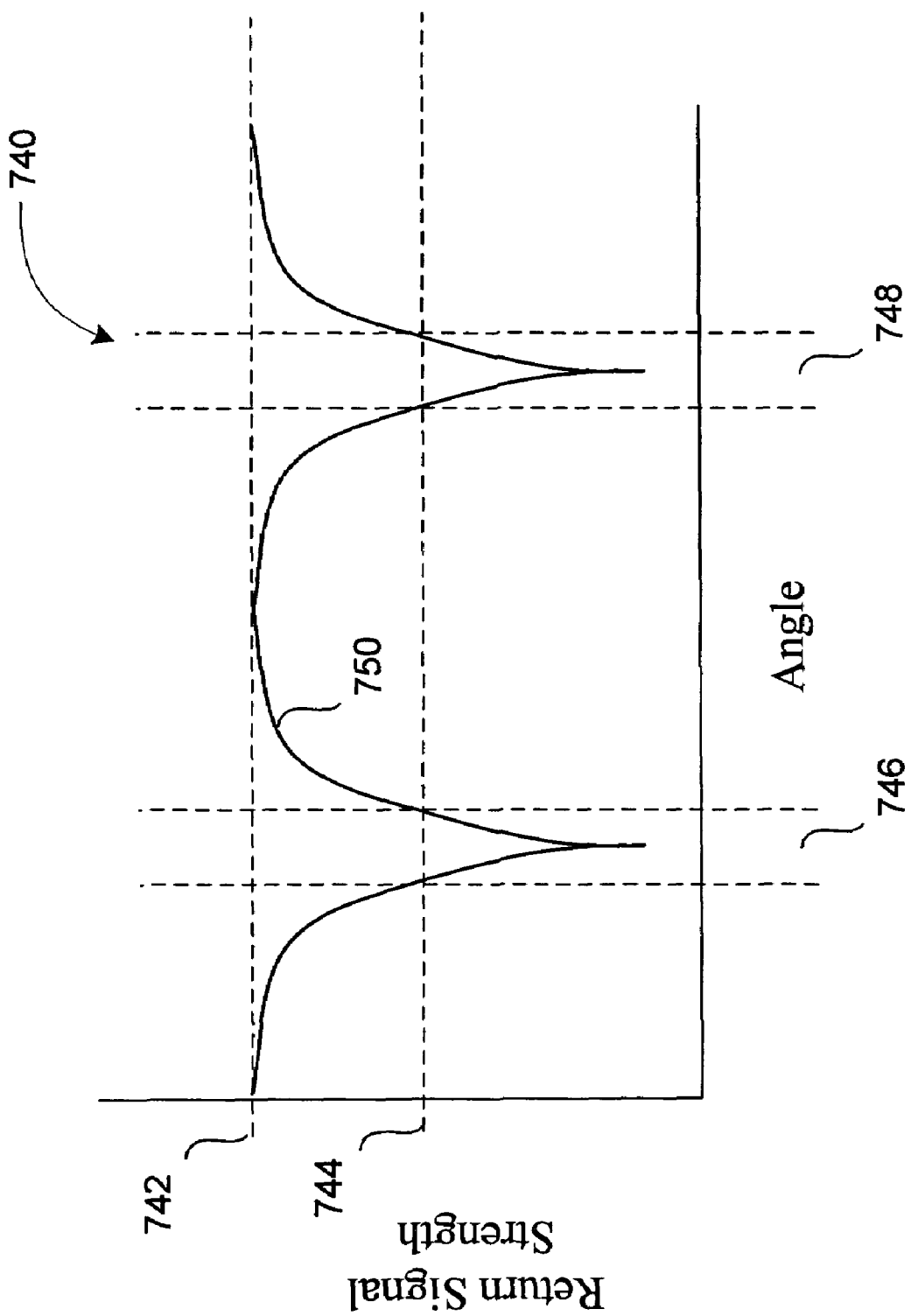
FIG. 7C is an illustration of the return signal strength in a range bin for a plurality of transmitted pulses, each transmitted pulse having been transmitted with a transmission antenna radiation pattern having a null over a different respective range of angles.

Referring to FIG. 7C, the orientation of the radiation pattern (as measured, for example, by one the radiation pattern's nulls) is set at a plurality of angles, a pulse transmitted while the pattern is oriented at each angle, and the strength of received signal recorded for each angle. As a result, a graph 740 of the return signal strength 750 as a function of angle can be formed for a particular range bin. A notable feature of graph 740 is the maximum signal strength level 742. Defining a second signal level 744, a set of associated angles, including angles 746 and 748 for which the return signal strength 750 is less than the signal level 744, may be determined. In some embodiments, the second signal level 744 is one-half the maximum signal level 742. In other embodiments, the second signal level is determined as a function of the radiation pattern 704 (see FIG. 7A and FIG. 7B).

Figure 8A:
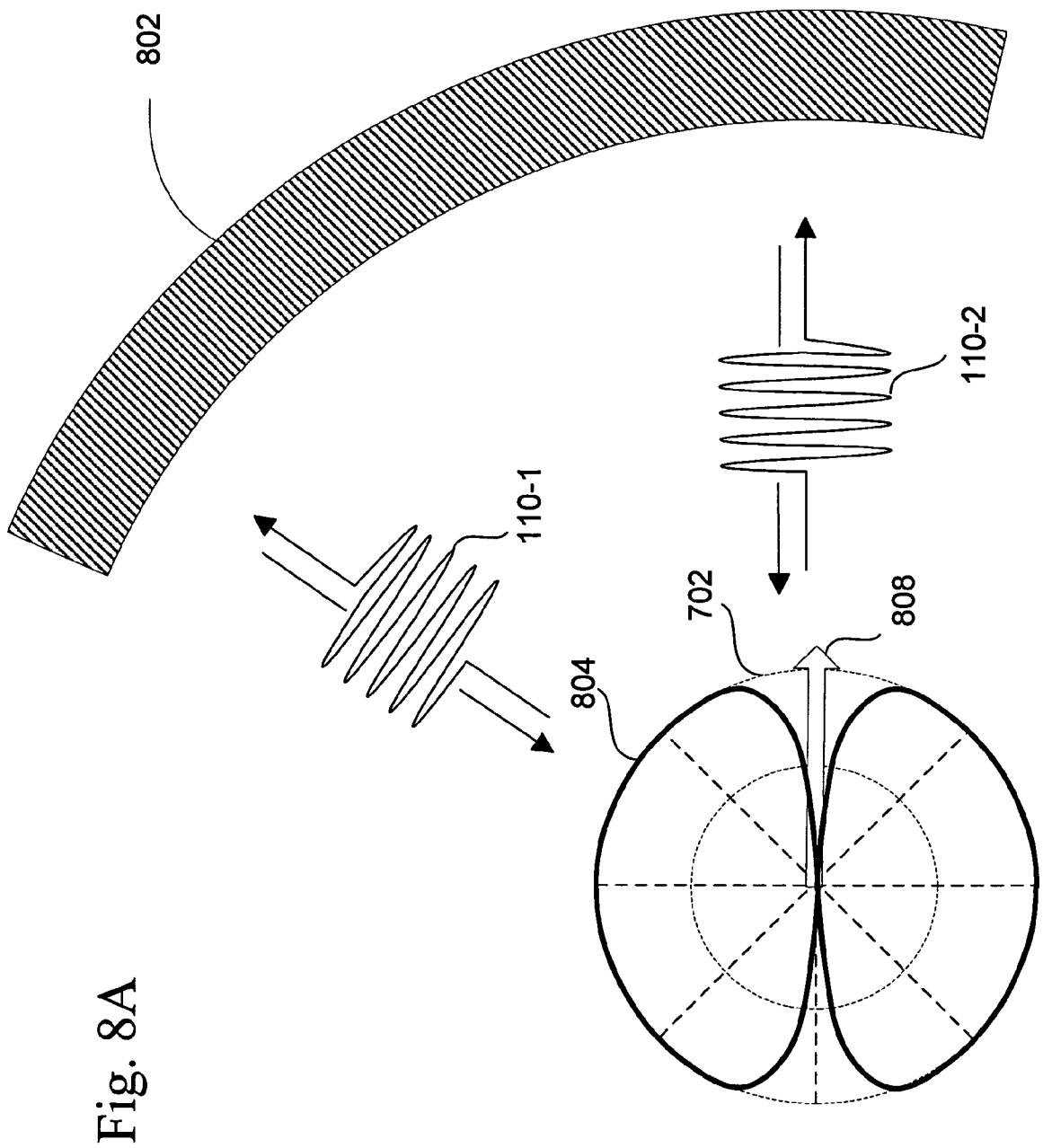
FIG. 8A is an illustration of a transmission antenna radiation pattern having a null over a first respective range of angles, a wall-like clutter object, a first transmitted pulse, a first reflected pulse, a second transmitted pulse, and a second reflected pulse.

Some clutter objects reflect pulses that are difficult to distinguish from pulses reflected by landmarks. Pulses reflected from clutter objects, however, can be distinguished from those reflected by landmarks based on angles 746 and 748 for which the return signal strength 750 is less than the signal level 744. Referring to FIG. 8A, a wall 802 reflects electromagnetic pulses that arrive at the device. In some embodiments, the transmission antenna has a radiation pattern 804, as measured relative to polar coordinate system 702, with a null characterized by direction 808. The nature of the received signal in FIG. 8A is more readily understood by considering several portions of the transmitted pulse, each portion localized in space by an angle or set of angles relative to polar coordinate system 702. For example, the pulse transmitted in FIG. 8A has a first portion 110-1 and a second portion 110-2, the first portion having a large magnitude relative to a second portion 110-2. This is because portion 110-1 is generated by angles of radiation pattern 804 at which the antenna transmits signals having relatively large magnitudes. In contrast, portion 110-2 is generated by angles of radiation pattern 804 at which the antenna transmits signals having relatively small magnitudes. Thus, the received signal, the strength of which depends on a summation of portions 110, is dominated by the strength of the reflected pulse corresponding to portion 110-1. In the geometry of FIG. 8A, it is expected that the return signal received from the range bin containing wall 802 will be weak for few, if any, directions 808. This is due to the large range of directions 808 at which the antenna transmits signals having relatively large magnitudes.

Figure 8B:
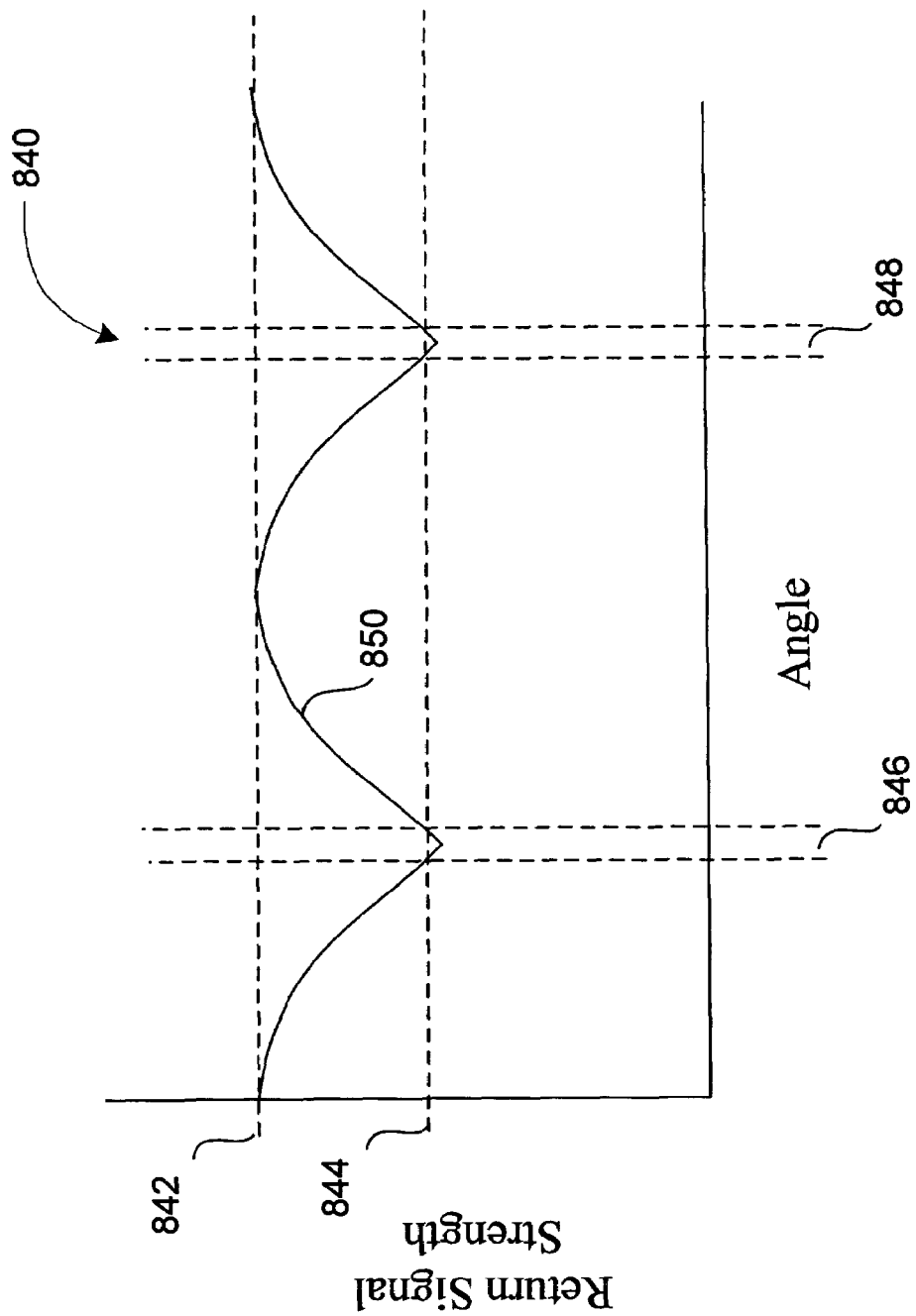
FIG. 8B is an illustration of the return signal strength in a range bin for a plurality of transmitted pulses, each transmitted pulse having been transmitted with a transmission antenna radiation pattern having a null over a different respective range of angles.

In some embodiments, the process above is repeated for a variety of directions 808, and the received return signal from a range bin corresponding to a distance between the device and wall 802 is examined. Referring to FIG. 8B, a graph 840 of return signal strength 850 as a function of the angle of direction 808 results. The maximum signal level 842 and a threshold signal level 844 are among the features of graph 840. In some embodiments, threshold signal level 844 is one-half the value of maximum signal level 842. In other embodiments, threshold signal level is 6 dB less than maximum signal level 842. A set of associated angles, including angles 846 and angles 848, are determined as angles for which the return signal strength 850 is less than threshold signal level 844.

Based on the number and location of these angles 846 and 848, in some embodiments the device determines whether a landmark or a clutter object such as a wall is present in a range bin. Clutter objects such as walls sometimes have associated angles, such as 846 and 848 (FIG. 8B) that are substantially less numerous (or have smaller ranges) than the associated angles, such as 746 and 748 (FIG. 7C), from a range bin containing a landmark. This is because, as depicted in FIG. 8A, a wall 802 will reflect a pulse 110-1 strongly, even when null direction 808 is directly illuminating the wall. Thus, a range bin containing a landmark can be distinguished from a range bin containing clutter objects such as walls by examining the associated angles.

Once the ranges and, optionally, angles between the device and the various landmarks are determined, some embodiments include positioning and navigation algorithms in primary and secondary storage 514 (FIG. 5). Positioning and navigation algorithms for this purpose are well-known in the art and include weighted least-squares, Kalman filtering, and other sequential estimation schemes. In general, there will be some likelihood associated with each landmark being properly identified. In this case, a maximum a posteriori (MAP) estimation filter should be used, as part of general observable integrity (RAIM) processing. In practical embodiments, erroneous measurements are likely to occur, such as those due to hardware anomalies and multipath interference. As a result, in some embodiments the positioning and navigation algorithms include some form of statistical outlier testing to detect and eliminate these erroneous measurements. Such tests are well known to those in the art and include externally Studentized residual tests and Kalman Filter innovations tests.

In some embodiments, the clutter environment is benign enough to resolve landmarks by range binning alone, and the device will not have to move to determine its position relative to the landmarks. In other embodiments, the clutter is not expected to be this benign, and a small linear movement of the device over 1 m or less is sufficient to resolve landmarks from clutter in accordance with the algorithm described in conjunction with FIG. 6.

In some embodiments, when the system is initialized the location and, possibly, number of landmarks is not known to the device. The device may move in a particular direction with a known velocity and begin to transmit pulses and receive return signals. Alternately, the device may be manually guided throughout a region of interest by an operator. The device may then build a list of possible landmarks with associated likelihoods of correctness. As more pulses are transmitted and more return signals received, the likelihoods may be updated. The device may define its own coordinate system, requiring six free parameters. This coordinate system may be referenced to the first three landmarks found with high confidence. After this, the coordinate system itself preferably does not change over time, even if one or more of the first three landmarks is moved, the positions of these three landmarks being changed in the coordinate system.

In other embodiments, information is provided to the device, for example via map data 512 in FIG. 5, such as architectural plans or particular landmark locations or orientations. The device may then use a coordinate system associated with this information to mark the positions of the landmarks. In this case at least a portion or a landmark map in that coordinate system must be entered in addition to any route information.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A positioning system, comprising:
a passive, isotropic reflecting landmark at a fixed position; and
a device configured to transmit an electromagnetic pulse, the pulse having a polarization; the device further configured to receive a return signal over a period of time, the return signal including a reflected pulse from the landmark, and to process the return signal so as to isolate the reflected pulse from the return signal and to determine a range from the device to the reflecting landmark;
the reflecting landmark comprising:
  a first passive reflector for reflecting electromagnetic pulses;
  a second passive reflector for reflecting electromagnetic pulses; and
  a static structure configured to statically position the second passive reflector at an angle relative to the first passive reflector, wherein the angle is about 90°;
the device including
  a data processor;
  at least one program module, executed by the data processor, the at least one program module containing instructions for:
    transmitting the pulse multiple times, each transmission of the pulse having a respective transmission beam pattern with a null over a different respective range of angles;
    determining from the return signals from the multiple pulse transmissions a first set of range candidates, each range candidate representing a possible range to the landmark, each range candidate having an associated range of angles; and
    analyzing the range of angles associated with each range candidate to produce a reduced set of range candidates that are consistent with one or more potential landmark positions.

2. The system of claim 1, wherein the null in the respective transmission beam pattern is less than 15° wide.

3. The system of claim 2, wherein the device includes at least two antennas driven by substantially identical signals having a phase difference, the phase difference controlling the range of angles of the null.

4. A positioning system, comprising
a passive, isotropic reflecting landmark at a fixed position;
a device configured to transmit an electromagnetic pulse, the pulse having a polarization; the device further configured to preferentially receive a return signal having the polarization over a period of time, the return signal including a reflected pulse from the reflecting landmark, and to process the return signal so as to isolate the reflected pulse from the return signal and to determine a range from the device to the reflecting landmark;
the reflecting landmark comprising:
  a first passive reflector for reflecting electromagnetic pulses;
  a second passive reflector for reflecting electromagnetic pulses; and
  a static structure configured to statically position the second passive reflector at an angle relative to the first passive reflector, wherein the angle is about 90°;
a vehicle locomotion mechanism for moving the device in a particular direction, at a velocity:
a data processor, and;
at least one program module, executed by the data processor, the at least one program module containing instructions for:
  transmitting the pulse at a first position of the device and determining from the received return signal a first set of range candidates, each range candidate representing a possible range to the reflecting landmark;
  transmitting the pulse at a second position of the device and determining from the received return signal a second set of range candidates; and
  processing the first and second sets of range candidates to produce a reduced set of range candidates that are consistent with one or more potential reflecting landmark positions.

5. The system of claim 4, wherein the polarization is a circular polarization.

6. The system of claim 4, wherein the polarization is selected from the group consisting of right-hand circular polarization (RHCP) and left-hand circular polarization (LHCP).

7. The system of claim 4, wherein the device includes at least one antenna configured to preferentially receive signals having the polarization.

8. The system of claim 4, wherein the device includes at least one antenna configured to both preferentially transmit the pulse having the polarization and to preferentially receive signals having the polarization.

9. The system of claim 4,
the at least one program module including instructions for:
  detecting a Doppler shift in the reflected pulse portion of the return signal; and
  determining an angle between the particular direction and a straight line between the device and the reflecting landmark.

10. The system of claim 4,
the at least one program module including instructions for:
  transmitting the pulse at a plurality of additional positions of the device and determining from the received return signal a plurality of additional sets of range candidates;
  processing the first and additional sets of range candidates to produce a single range candidate corresponding to the reflecting landmark.

11. The system of claim 4,
the at least one program module including instructions for:
  transmitting the pulse multiple times, each transmission of the pulse having a respective transmission beam pattern with a null over a different respective range of angles;
  determining from the return signals from the multiple pulse transmissions a third set of range candidates, each range candidate representing a possible range to the reflecting landmark, each range candidate having an associated range of angles; and analyzing the range of angles associated with each range candidate to produce a reduced set of range candidates, comprising said first set of range candidates, that are consistent with one or more potential reflecting landmark positions.

12. The system of claim 11, wherein the null in the respective transmission beam pattern is less than 15° wide.

13. The system of claim 11, wherein the device includes at least two antennas driven by substantially identical signals having a phase difference, the phase difference controlling the range of angles of the null.

14. The system of claim 4,
the at least one program module including instructions for:
  transmitting a series of pulses;
  generating from the return signals from the multiple pulse transmissions a series of received pulse data sets corresponding to at least a subset of the received pulses, each received pulse data set having received pulse data from two or more of the plurality of distinct locations;
  combining the pulse data within each pulse data set to produce a combined return signal having a receive pattern null in an associated range of angles;
  determining from the combined return signals a third set of range candidates, each range candidate representing a possible range to the reflecting landmark, and determining for each range candidate angle-related signal strength data comprising a plurality of amplitude values associated with a respective plurality of angle ranges; and
  analyzing the angle-related signal strength data associated with at least one of the range candidates to produce said reduced set of range candidates that are consistent with one or more potential reflecting landmark positions.

15. The system of claim 4,
the at least one program module including instructions for:
  transmitting a series of pulses;
  generating from the return signals from the multiple pulse transmissions a series of received pulse data sets corresponding to at least a subset of the received pulses, each received pulse data set having received pulse data from two or more of the plurality of distinct locations;
  combining the received pulse data multiple times, using a plurality of phase offsets, to produce multiple combined return signals, each having a receive pattern null in an associated range of angles;
  determining from the combined return signals a third set of range candidates, each range candidate representing a possible range to the reflecting landmark, and determining for each range candidate angle-related signal strength data comprising a plurality of amplitude values associated with a respective plurality of angle ranges; and
  analyzing the angle-related signal strength data associated with at least one of the range candidates to produce said reduced set of range candidates that are consistent with one or more potential reflecting landmark positions.

16. The system of claim 4,
the at least one program module including instructions for:
  repeating the transmitting and receiving a plurality of times;
  combining the resulting return signals to produce a representative return signal; and
processing the representative return signal to produce a set of range candidates that are consistent with one or more potential reflecting landmark positions.

\* \* \* \* \*

UNITED STATES PATENT AND TRADEMARK OFFICE
CERTIFICATE OF CORRECTION

| | | |
|---|---|---|
| PATENT NO. | : 7,250,901 B2 | Page 1 of 1 |
| APPLICATION NO. | : 10/614097 | |
| DATED | : July 31, 2007 | |
| INVENTOR(S) | : Stephens | |

It is certified that error appears in the above-identified patent and that said Letters Patent is hereby corrected as shown below:

Column 16, line 7, after the word "velocity" please delete the ":" and insert a -- ; --.

Signed and Sealed this

Sixth Day of November, 2007

JON W. DUDAS
*Director of the United States Patent and Trademark Office*